(12) United States Patent
Ichikawa

(10) Patent No.: US 10,728,985 B2
(45) Date of Patent: Jul. 28, 2020

(54) VEHICLE LAMP AND LIGHTING CIRCUIT

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/593,413

(22) Filed: Oct. 4, 2019

(65) Prior Publication Data
US 2020/0120767 A1    Apr. 16, 2020

(30) Foreign Application Priority Data

Oct. 16, 2018  (JP) .................................. 2018-195218
Nov. 28, 2018  (JP) .................................. 2018-222594

(51) Int. Cl.
| | |
|---|---|
| *H05B 45/10* | (2020.01) |
| *H05B 45/395* | (2020.01) |
| *H02M 1/44* | (2007.01) |
| *H02J 7/00* | (2006.01) |
| *H05B 45/37* | (2020.01) |
| *B60Q 1/00* | (2006.01) |
| *H02J 7/34* | (2006.01) |

(52) U.S. Cl.
CPC .......... *H05B 45/395* (2020.01); *H02J 7/0068* (2013.01); *H02M 1/44* (2013.01); *H05B 45/37* (2020.01); *B60Q 1/00* (2013.01); *H02J 7/345* (2013.01)

(58) Field of Classification Search
CPC ...... H05B 45/37; H05B 45/395; H05B 37/02; H05B 37/0227; H05B 37/0272; H05B 33/08; H05B 33/0815; H05B 33/0842; H05B 33/0845; H05B 33/0881; H02J 7/0668; H02J 7/345; H02M 1/44; B60Q 1/00
See application file for complete search history.

(56) References Cited

U.S. PATENT DOCUMENTS

| | | | |
|---|---|---|---|
| 9,232,596 B2 * | 1/2016 | Jelaca ................ | H05B 33/0845 |
| 2014/0125246 A1 * | 5/2014 | Sasaki .................... | H05B 45/10 315/224 |
| 2019/0016249 A1 | 1/2019 | Ichikawa et al. | |

FOREIGN PATENT DOCUMENTS

WO        2017/150322 A1      9/2017

* cited by examiner

*Primary Examiner* — Jimmy T Vu

(74) *Attorney, Agent, or Firm* — Sughrue Mion, PLLC

(57) ABSTRACT

A lighting circuit of a semiconductor light source includes a light control circuit and a constant current circuit. The light control circuit is configured to generate a pulsed light control signal having a duty ratio corresponding to the input pulse signal and having at least one edge softened in each pulse. The constant current circuit includes a linear regulator. The constant current circuit is configured to stabilize a lamp current flowing into the semiconductor light source to a target amount corresponding to the light control signal.

15 Claims, 16 Drawing Sheets

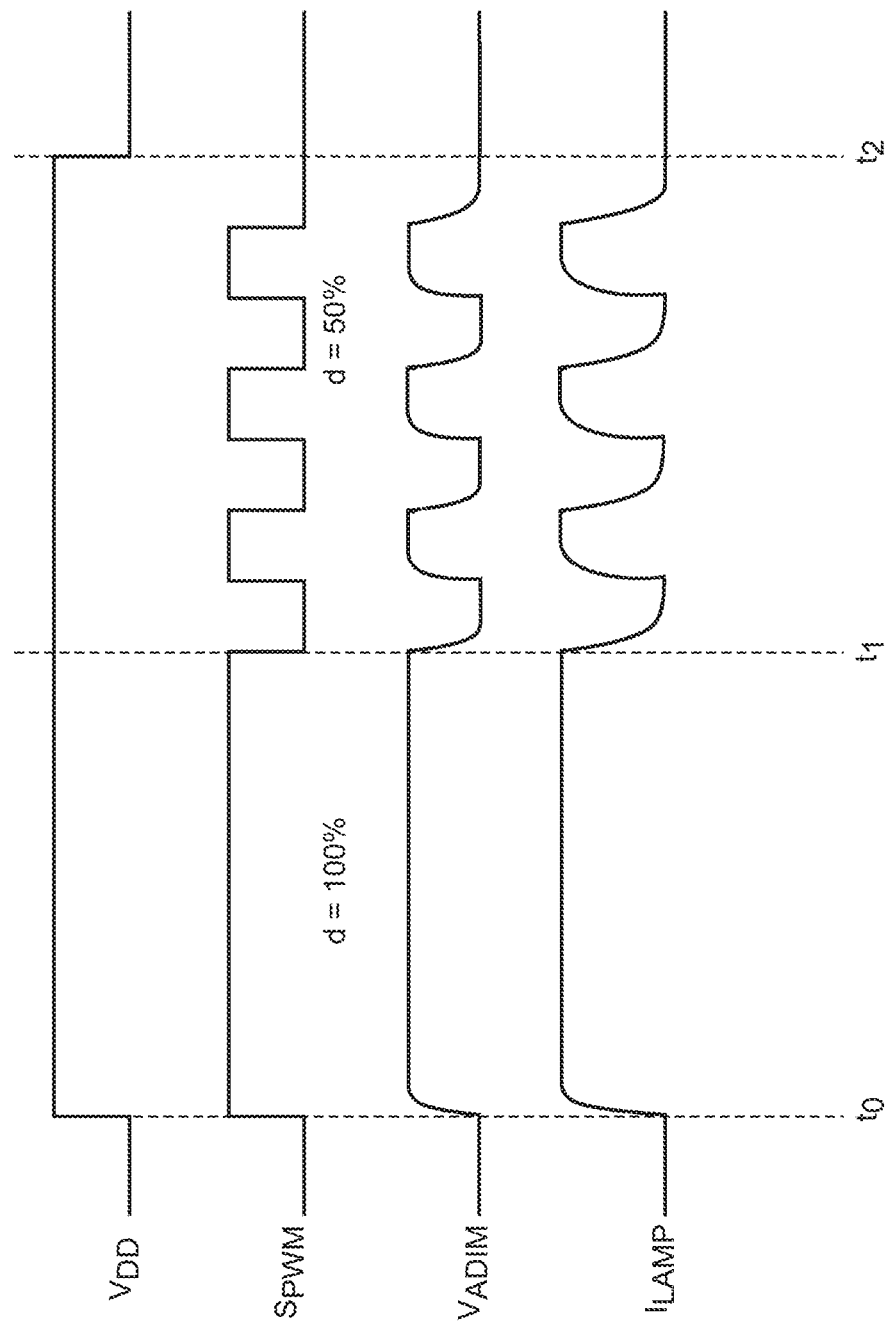

VEHICLE LAMP AND LIGHTING CIRCUIT

INCORPORATION BY REFERENCE

The disclosures of Japanese Patent Application No. 2018-195218 filed on Oct. 16, 2018 and Japanese Patent Application No. 2018-222594 filed on Nov. 28, 2018, including the specification, drawings and abstract are incorporated herein by reference in their entirety.

BACKGROUND

1. Technical Field

The present disclosure relates to a vehicle lamp and lighting circuit used for automobiles or the like.

2. Description of Related Art

In the field of lamps, light control is one of the important functions. In recent years, semiconductor light sources, such as light emitting diodes (LED), are adopted for the lamps. There are typically two methods for light control of the semiconductor light sources: an analog light control (linear light control) method; and a pulse width modulation (PWM) light control method. The analog light control method is for regulating a direct current level of driving current that flows into the semiconductor light sources. The PWM light control method is for regulating an average level of the driving current by switching the current that flows into the semiconductor light sources to regulate the ratio of an ON period.

There are two types of lighting circuits for the semiconductor light sources: a lighting circuit using a DC-DC converter; and a lighting circuit using a linear regulator (series regulator). The former is highly efficient, but a high cost. Accordingly, the linear regulator is adopted for the lamps required cost reduction.

FIG. 1 is a block diagram of a lamp including a linear regulator (series regulator). The lamp 100R includes a light source 110 and a lighting circuit 200R. The light source 110 includes one or more light-emitting elements 112. The lighting circuit 200R receives an electric power source voltage $V_{DD}$ from a battery, and stabilizes a driving current (lamp current) $I_{LAMP}$ flowing into the light source 110 to the current amount corresponding to a target luminance. The lighting circuit 200R includes a linear regulator 210 and a switch SW for PWM light control.

The linear regulator 210 includes an output transistor 212, a resistance R1, and an error amplifier (operational amplifier) 214 to stabilize the lamp current $I_{LAMP}$ to a current amount $I_{REF}$ that changes linearly with respect to a reference voltage $V_{ADIM}$.

$$I_{REF}=(V_{DD}-V_{ADIM})/R \qquad (1)$$

The switch SW is provided between a gate of the output transistor 212 and an electric power source line 102 (or between the gate and a source). While the switch SW is set to OFF, the lamp current $I_{LAMP}$ of a target amount $I_{REF}$ expressed by expression (1) flows, and the light source 110 is turned on (turning-on period). While the switch SW is set to ON, the output transistor 212 is set to OFF. As a result, the lamp current $I_{LAMP}$ becomes zero, and the light source 110 is turned off (turning-off period).

When the switch SW is switched in a prescribed PWM cycle in response to a control signal $S_{PWM}$ for PWM light control, the turning-on period and the turning-off period are alternately generated. Therefore, when a duty ratio of the control signal $S_{PWM}$ is changed, an average amount of the lamp current $I_{LAMP}$ flowing into the light source 110 changes, which causes a change in effectual luminance of the light source 110.

FIG. 2 is an operation waveform chart of the lamp 100R of FIG. 1. When the electric power source voltage $V_{DD}$ is input at time t0, the lighting circuit 200R starts up. During the time from t0 to t1, the duty ratio of the PWM signal $S_{PWM}$ is 100% (i.e., fixed to high level), so that the lamp current $I_{LAMP}$ is stabilized to the target amount $I_{REF}$.

After time t1, in order to dim the light source 110, PWM light control (also called PWM dimming) is set to ON. Specifically, the duty ratio d of the PWM signal $S_{PWM}$ drops (by 50% in this example). Consequently, the lamp current $I_{LAMP}$ is $I_{REF}$ during a turning-on period TON, and is 0 A during a turning-off period TOFF, with an average lamp current ILAMP being defined by $I_{LAMP}(AVE)=I_{REF}\times d$.

When the electric power source voltage $V_{DD}$ is cut off at time t2, the lighting circuit 200R stops, and the lamp current $I_{LAMP}$ becomes zero.

SUMMARY

The lamp 100R including a linear regulator has an advantage of less electromagnetic noise than the lamp using a DC-DC converter. However, when PWM light control is performed as described above, the lamp current $I_{LAMP}$ is switched, which causes generation of electromagnetic noise.

The present disclosure provides a vehicle lamp and a lighting circuit, capable of reducing electromagnetic noise or easily coping with the electromagnetic noise.

A lighting circuit of a semiconductor light source according to a first aspect of the present disclosure includes a light control circuit and a constant current circuit. The light control circuit is configured to generate a pulsed light control signal having a duty ratio corresponding to an input pulse signal and having at least one edge softened in each pulse. The constant current circuit includes a linear regulator. The constant current circuit is configured to stabilize a lamp current flowing into the semiconductor light source to a target amount corresponding to the light control signal.

The lamp current has a waveform that changes based on the waveform of the light control signal. Therefore, the lighting circuit of the semiconductor light source according to the first aspect of the present disclosure can restrain a steep change of the lamp current by softening the waveform of the light control signal. This makes it possible to reduce electromagnetic noise or makes it easy to cope with the electromagnetic noise.

In the lighting circuit of the semiconductor light source according to the first aspect of the present disclosure, the light control circuit may include a capacitor, and a charging and discharging circuit configured to charge and discharge the capacitor in accordance with the pulse signal. The light control signal may be configured to be in accordance with the voltage of the capacitor. The lighting circuit of the semiconductor light source according to the first aspect of the present disclosure can generate a light control signal having a softened edge by limiting at least one of a charging speed and a discharging speed.

In the lighting circuit of the semiconductor light source according to the first aspect of the present disclosure, the charging and discharging circuit may include a first switch, a first resistance, and a second switch. The first switch and the first resistance may be provided in series between one end of the capacitor and a reference voltage line. The second switch may be provided between the one end of the capacitor and a ground line. The first switch and the second switch may be configured to perform complementary switching in accordance with the pulse signal. The lighting circuit of the semiconductor light source according to the first aspect of the present disclosure can soften a positive edge of the light control signal in accordance with a resistance value of the first resistance.

In the lighting circuit of the semiconductor light source according to the first aspect of the present disclosure, the charging and discharging circuit may further include a second resistance provided in series with the second switch between the one end of the capacitor and the ground line. The lighting circuit of the semiconductor light source according to the first aspect of the present disclosure can soften a negative edge of the light control signal in accordance with the resistance value of the second resistance.

In the lighting circuit of the semiconductor light source according to the first aspect of the present disclosure, the charging and discharging circuit may include a first switch, a second switch, and a second resistance. The first switch may be provided between one end of the capacitor and a reference voltage line. The second switch and the second resistance may be provided in series between the one end of the capacitor and a ground line. The first switch and the second switch may be configured to perform complementary switching in accordance with the pulse signal. The lighting circuit of the semiconductor light source according to the first aspect of the present disclosure can soften the negative edge of the light control signal in accordance with the resistance value of the second resistance.

In the lighting circuit of the semiconductor light source according to the first aspect of the present disclosure, the charging and discharging circuit may include a first current source provided between one end of the capacitor and a reference voltage line, and a second current source provided between the one end of the capacitor and a ground line. The first current source and the second current source may be configured to complementarily be set to ON in accordance with the pulse signal. The lighting circuit of the semiconductor light source according to the first aspect of the present disclosure can soften the waveform of the light control signal by lowering a current supply capacity of at least one of the first current source and the second current source (increasing output impedance).

In the lighting circuit of the semiconductor light source according to the first aspect of the present disclosure, the charging and discharging circuit may include a driver and a resistance. The driver may be configured to output a high voltage and a low voltage corresponding to the pulse signal. The resistance may be provided between an output of the driver and one end of the capacitor. The lighting circuit of the semiconductor light source according to the first aspect of the present disclosure can soften an output signal of the driver by a low pass filter formed with the resistance and the capacitor.

In the lighting circuit of the semiconductor light source according to the first aspect of the present disclosure, the lighting circuit may further include a third switch provided between one of an electric power source line and a ground line, and a gate of an output transistor of the linear regulator. In the lighting circuit of the semiconductor light source according to the first aspect of the present disclosure, when the third switch is set to ON, the lamp current can reliably be cut off even when the operational amplifier of the linear regulator has offset voltage.

The lighting circuit of the semiconductor light source according to the first aspect of the present disclosure may include a pulse generator configured to receive a control signal that specifies luminance of the semiconductor light source, and generate the pulse signal having a duty ratio corresponding to the control signal.

In the lighting circuit of the semiconductor light source according to the first aspect of the present disclosure, the semiconductor light source may include a first light source and a second light source each having one of an anode side and a cathode side being connected in common. The lighting circuit may further include a first serial switch that is in series with the first light source, and a second serial switch that is in series with the second light source.

In the lighting circuit of the semiconductor light source according to the first aspect of the present disclosure, the lighting circuit may be included in the vehicle lamp including a semiconductor light source.

A vehicle lamp according to a second aspect of the present disclosure includes a semiconductor light source, a light control circuit, and a constant current circuit. The light control circuit is configured to receive a control signal that specifies luminance of the semiconductor light source, and generate a pulsed light control signal. The light control signal has a duty ratio corresponding to the control signal, and has at least one soft edge in each pulse. The constant current circuit includes a linear regulator. The constant current circuit is configured to stabilize a lamp current flowing into the semiconductor light source to a target amount corresponding to the light control signal.

A vehicle lamp according to a third aspect of the present disclosure includes a first light source, a first serial switch, a second light source, a second serial switch, a first input terminal, a second input terminal, a pulse generator, a light control circuit, and a constant current circuit. The first light source and the first serial switch are provided in series on a first route. The second light source and the second serial switch are provided in series on a second route that is in parallel with the first route. The first input terminal is configured to receive a first input voltage that becomes active when the first light source is to be turned on. The second input terminal is configured to receive a second input voltage that becomes active when the second light source is to be turned on. The pulse generator is configured to generate a pulse signal having a first duty ratio when the first input voltage is active, and having a second duty ratio when the first input voltage is inactive. The light control circuit is configured to generate a pulsed light control signal having a duty ratio corresponding to the pulse signal and having at least one edge softened in each pulse. The constant current circuit is configured to stabilize a lamp current flowing into the light sources including the first route and the second route to a target amount corresponding to the light control signal.

In the vehicle lamp according to the third aspect of the present disclosure, the second input voltage may be a signal that alternately repeats high and low, when the second input voltage is active. The second serial switch may be controlled to be set to ON and OFF in accordance with the second input voltage. The first serial switch may be configured to be set to ON when the first input voltage is active and the second input voltage is inactive.

The vehicle lamp according to the third aspect of the present disclosure may include a switch controller configured such that the first serial switch is fixedly set to OFF when the second input voltage is active. The second input voltage may be a signal that alternately repeats high and low, when the second input voltage is active.

Aspects including any combination of the component members disclosed, or including the component members or representations of the present disclosure mutually exchanged among methods, apparatuses, and systems are also effective as the aspects of the present disclosure.

The first to third aspects of the present disclosure can restrain electromagnetic noise, or easily cope with the electromagnetic noise.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is an operation waveform chart of the lamp in FIG. 3;

DETAILED DESCRIPTION OF EMBODIMENTS

Figure 1:
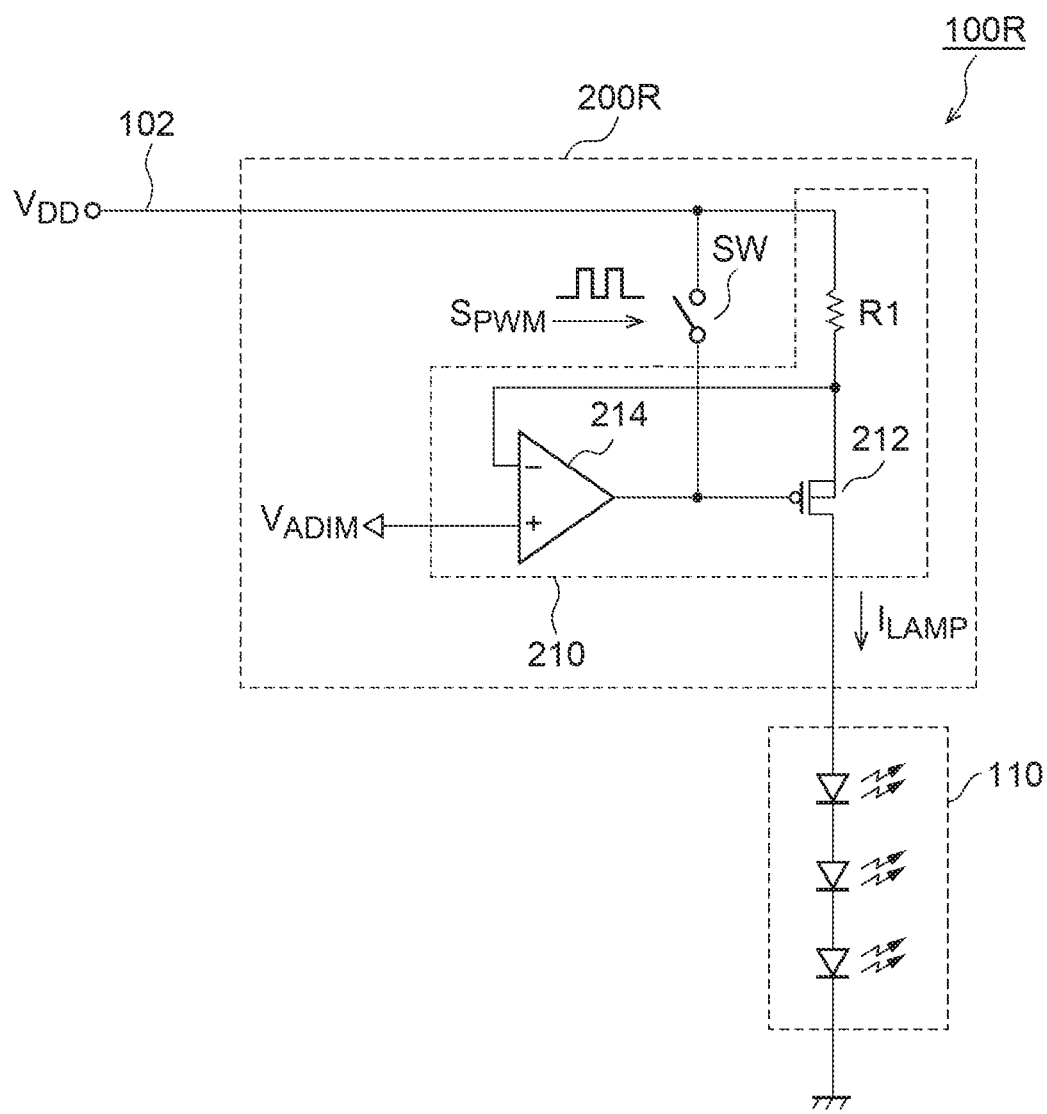
FIG. 1 is a block diagram of a lamp including a linear regulator.

The present disclosure will be described below based on preferred embodiments with reference to the drawings. Identical or similar component elements, members, and processes shown in the drawings will be designated by identical reference numerals, and redundant descriptions thereof will properly be omitted. The embodiments are merely illustrative and are not intended to limit the present disclosure. All the characteristics or combinations thereof that are described in the embodiments are not necessarily essential for the present disclosure.

In the present specification, a phrase "the state where a member A is connected with a member B" does not limitedly refer to the state where the member A and the member B are physically and directly connected. The phrase also refers to the state where the member A and the member B are indirectly connected through another member that exerts no substantial influence on the electric connection state of the member A and member B, or that does not impair the functions or effects demonstrated by coupling of the member A and the member B.

Similarly, a phrase "the state where a member C is provided between the member A and the member B" does not limitedly refer to the state where the member A and the member C, or the member B and the member C are directly connected. The phrase also refers to the state where the member A and the member C, or the member B and the member C are indirectly connected through another member that exerts no substantial influence on the electric connection state of the member A and the member C, or the member B and the member C, or that does not impair the functions or effects demonstrated by coupling thereof.

In the present specification, reference numerals affixed onto electrical signals, such as voltage signals and current signals, or circuit elements, such as resistances and capacitors, are used to indicate corresponding voltage values and electric current values, or resistance values and capacitance values as necessary.

First Embodiment

Figure 3:
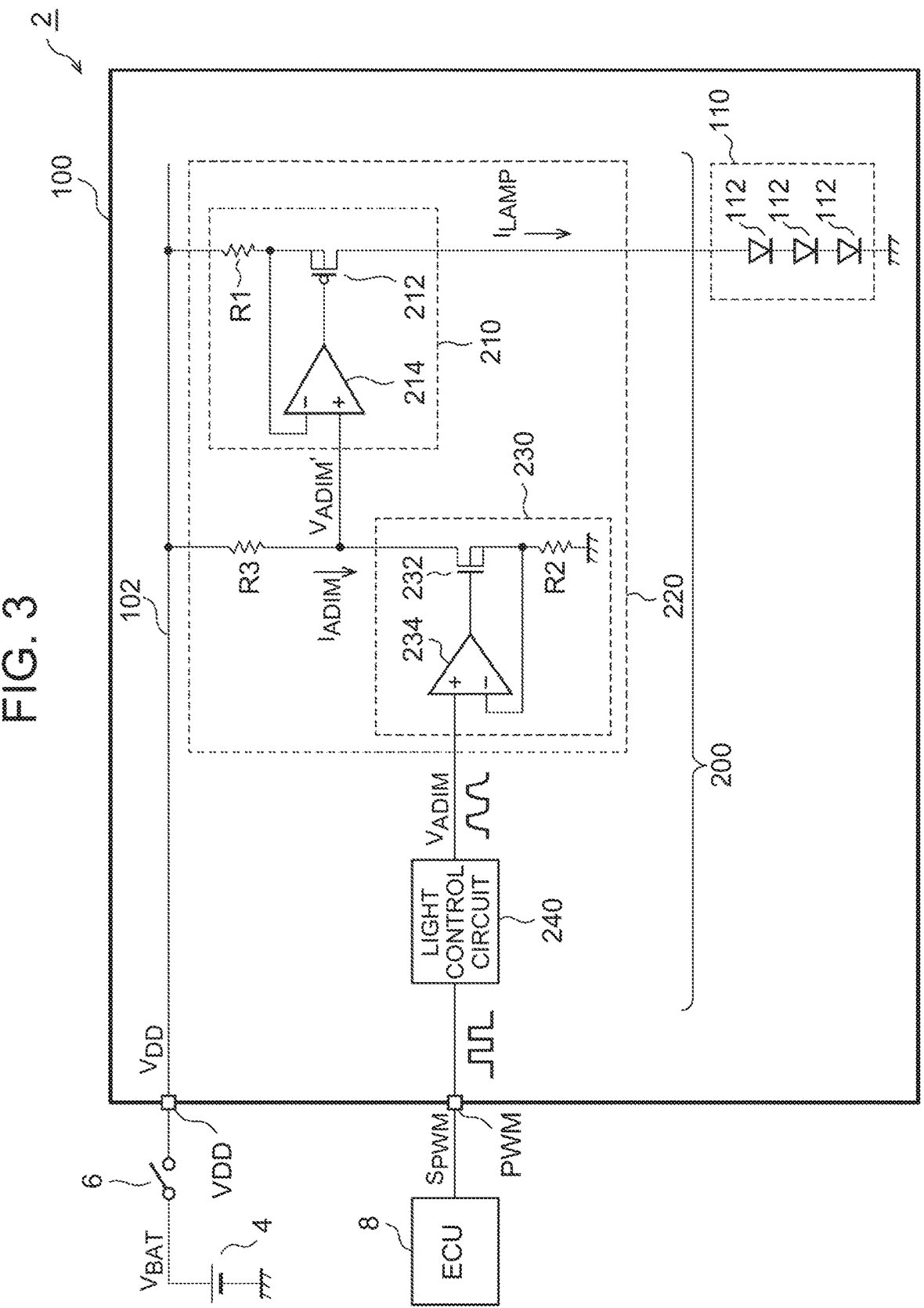
FIG. 3 is a block diagram of a lamp system including a lamp according to a first embodiment.

FIG. 3 is a block diagram of a lamp system 2 including a lamp 100 according to a first embodiment. The lamp system 2 includes a battery 4, a switch 6, and an electronic control unit (ECU) 8. The lamp 100 has an electric power source terminal VDD that receives supply of an electric power source voltage $V_{DD}$ from the battery 4 through the switch 6. The switch 6 is controlled in accordance with turning on-off instructions for the lamp 100.

The lamp 100 includes a light source 110 and a lighting circuit 200. The light source 110 includes a plurality of light-emitting elements 112 connected in series. Although LEDs are suitable as the light-emitting elements 112, other semiconductor light-emitting elements, such as laser diodes (LDs) and organic EL elements may also be used.

The lighting circuit 200 supplies a driving current (lamp current) $I_{LAMP}$ to the light source 110, and controls the lamp current $I_{LAMP}$ to regulate the luminance of the light source 110.

The lighting circuit 200 includes a constant current circuit 220 and a light control circuit 240. The constant current circuit 220 includes a linear regulator 210 to stabilize the lamp current $I_{LAMP}$ flowing into the light source 110 to a target amount $I_{REF}$ corresponding to a light control signal $V_{ADIM}$.

The linear regulator 210 includes a resistance R1, an output transistor 212, and an error amplifier (operational amplifier) 214. When a voltage input into a non-inverting input terminal (+) of the error amplifier 214 is defined as $V_{ADIM}'$, the target amount $I_{REF}$ of the lamp current $I_{LAMP}$ is given by expression (2):

$$I_{REF}=(V_{DD}-V_{ADIM}')/R1 \quad (2)$$

The constant current circuit 220 includes a V-I converter 230 and a resistance R3, as well as the linear regulator 210.

The V-I converter 230 converts a light control signal $V_{ADIM}$ into a current $I_{ADIM}$ proportional to the light control signal $V_{ADIM}$. When a conversion gain (conductance) is defined as k, the current $I_{ADIM}$ is expressed by expression (3):

$$I_{ADIM} = k \times V_{ADIM} \quad (3)$$

Although the configuration of the V-I converter 230 is not particularly limited, the V-I converter 230 of FIG. 3 includes a transistor 232, a resistance R2, and an operational amplifier 234. In this case, the conversion gain k is expressed by expression (4):

$$k = 1/R2 \quad (4)$$

The voltage $V_{ADIM}'$ at a node connecting the V-I converter 230 and the resistance R3 is expressed by expression (5):

$$V_{ADIM}' = V_{DD} - R3 \times I_{ADIM} \quad (5)$$

Expressions (3), (4) are substituted in expression (5) to obtain expression (6):

$$V_{ADIM}' = V_{DD} - R3 \times k \times V_{ADIM} = V_{DD} - R3/R2 \times V_{ADIM} \quad (6)$$

When expression (6) is substituted into expression (2), input-output characteristics of the constant current circuit 220 can be obtained as expressed by expression (7):

$$I_{REF} = R3/(R1 - R2) \times V_{ADIM} \quad (7)$$

The light control terminal PWM of the lamp 100 receives a pulse signal $S_{PWM}$ for PWM light control that is generated by the ECU 8. The pulse signal $S_{PWM}$ has a duty ratio d corresponding to a target luminance (dimming rate) of the light source 110.

The pulse signal $S_{PWM}$ is supplied to the light control circuit 240. The light control circuit 240, which has the duty ratio d corresponding to the pulse signal $S_{PWM}$, generates a light control signal $V_{ADIM}$ having at least one edge softened in each pulse.

The configuration of the lamp 100 is as described above. Description is now given of the operation of the lamp 100. FIG. 4 is an operation waveform chart of the lamp 100 in FIG. 3. The switch 6 is set to ON at time t0, when the electric power source voltage $V_{DD}$ is supplied to the lamp 100, and the lighting circuit 200 starts up. During the time from t0 to t1, a duty ratio of the PWM signal $S_{PWM}$ is 100% (i.e., fixed to high level). The analog light control signal $V_{ADIM}$ serves as a DC signal, and the lamp current $I_{LAMP}$ is stabilized to a target amount $I_{REF}$.

After time t1, the duty ratio d of the PWM signal $S_{PWM}$ is set to 50% in order to dim the light source 110. The light control circuit 240 generates an analog light control signal $V_{ADIM}$ based on the PWM signal $S_{PWM}$. The analog light control signal $V_{ADIM}$ has the same duty ratio d as the PWM signal $S_{PWM}$, though the edges of the analog light control signal $V_{ADIM}$ are softened (in this example, both the positive edge and the negative edge are softened). As a result, the lamp current $I_{LAMP}$ generated in the constant current circuit 220 also has a softened waveform.

When the switch 6 is turned off, and the electric power source voltage $V_{DD}$ is cut off at time t2, the lighting circuit 200 stops, and the lamp current $I_{LAMP}$ becomes zero.

The operation of the lamp 100 is as described above. The lamp current $I_{LAMP}$ has a waveform that changes based on the waveform of the light control signal $V_{ADIM}$. Therefore, a steep change of the lamp current $I_{LAMP}$ can be restrained by softening the waveform of the light control signal $V_{ADIM}$. This makes it possible to reduce electromagnetic noise or makes it easy to cope with the electromagnetic noise.

Description is now given of some configuration examples of the light control circuit 240.

Figures 5A, 5B:
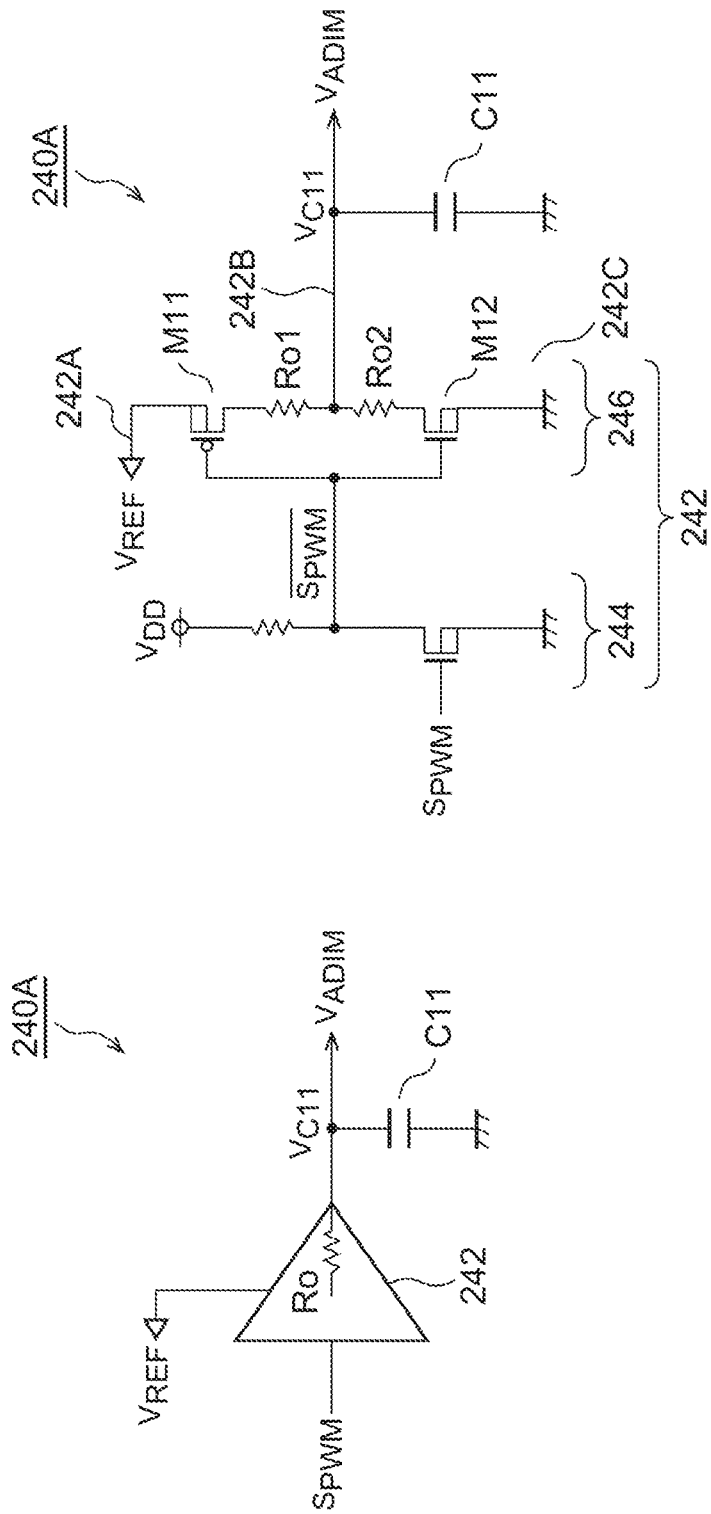
FIG. 5A is a circuit diagram of a configuration example of a light control circuit.
FIG. 5B is a circuit diagram of a configuration example of the light control circuit.

FIGS. 5A and 5B are circuit diagrams showing configuration examples of the light control circuit 240 (240A). The light control circuit 240A of FIG. 5A includes a capacitor C11 and a charging and discharging circuit 242. The capacitor C11 has one end grounded and the other end connected with an output of the charging and discharging circuit 242. The charging and discharging circuit 242 charges and discharges the capacitor C11 in accordance with a pulse signal $S_{PWM}$. A light control signal $V_{ADIM}$ is in accordance with a voltage $V_{C11}$ that is generated in the capacitor C11.

The charging and discharging circuit 242 includes a buffer (or an inverter) designed to have an intentionally high output impedance Ro, for example. On the final stage of the buffer (inverter), there is an electric power source terminal that receives a reference voltage $V_{REF}$. The reference voltage $V_{REF}$ defines the high level of the voltage $V_{C11}$ of the capacitor C11. Analog light control can be implemented by changing the reference voltage $V_{REF}$.

FIG. 5B is a specific configuration example of the light control circuit 240A of FIG. 5A. The charging and discharging circuit 242 is a buffer including two inverters 244, 246 connected in series. The preceding inverter 244 logically inverts the pulse signal $S_{PWM}$. The subsequent inverter 246 has an electric power source terminal 242A that receives the reference voltage $V_{REF}$. Between the electric power source terminal 242A and the output terminal 242B of the inverter 246, a PMOS transistor (high-side transistor) M11 and a resistance Ro1 are provided in series. The PMOS transistor (high-side transistor) M11 may be regarded as a first switch, and the resistance Ro1 as a first resistance. Between a grounding terminal 242C of the inverter 246 and the output terminal 242B, an NMOS transistor (low-side transistor) M12 and a resistance Ro2 are provided in series. The NMOS transistor (low-side transistor) M12 may be regarded as a second switch, and the resistance Ro2 as a second resistance.

Figure 6:
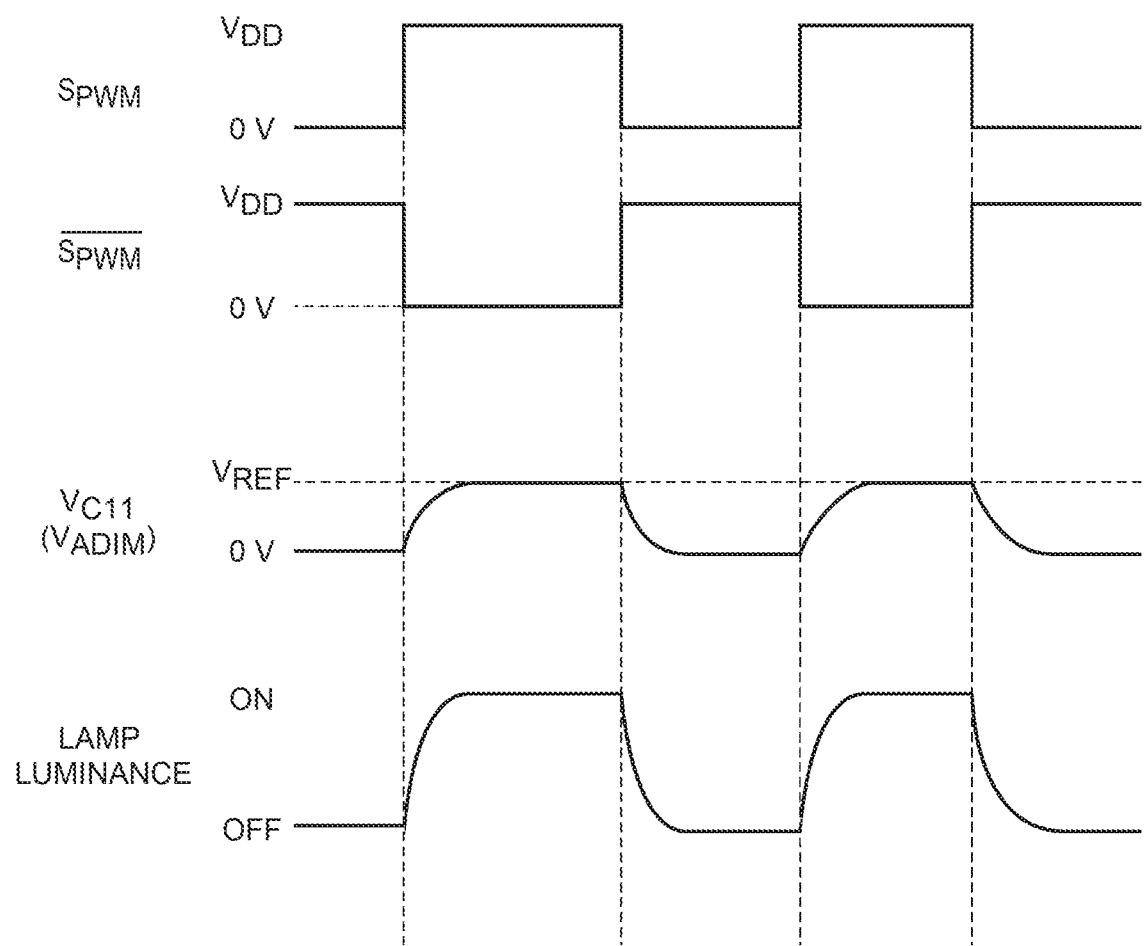
FIG. 6 is an operation waveform chart of the light control circuit in FIG. 5B.

FIG. 6 is an operation waveform chart of the light control circuit 240A in FIG. 5B. The inverter 244 inverts the pulse signal $S_{PWM}$ to generate an inverted pulse signal $\neg S_{PWM}$. A symbol "¬" represents a logic inversion that is expressed as a bar in the drawing. The capacitor C11 is charged with a time constant defined by its capacity and the resistance Ro1, and is discharged with a time constant defined by the resistance Ro2. As a result, the voltage $V_{C11}$ of the capacitor C11, that is, the light control signal $V_{ADIM}$, has the waveform of a softened pulse signal $S_{PWM}$.

In this example, both the positive edge and the negative edge of the light control signal $V_{ADIM}$ are softened. However, only one of the edges may be softened. In that case, one of the resistances Ro1, Ro2 may be omitted.

The light control circuit 240A in FIG. 5B can set a charging speed and a discharging speed of the capacitor C11 in accordance with the resistances Ro1, Ro2. The charging and discharging speeds may be lowered with ON-resistance, by downsizing the transistors M11, M12 instead of omitting the resistance Ro1, Ro2.

Figure 7A:
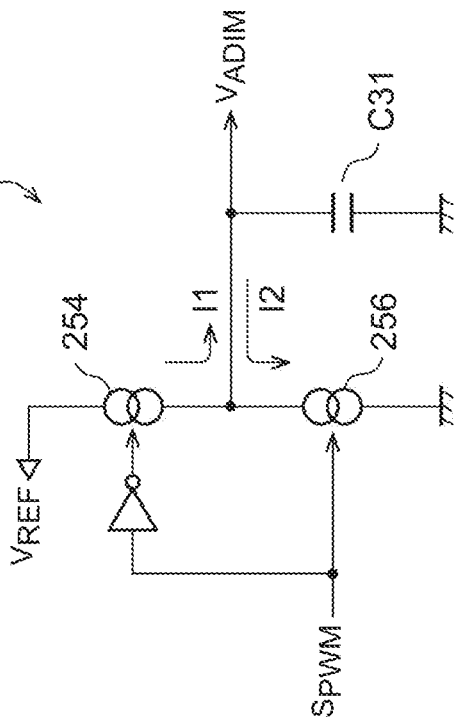
FIG. 7A is a circuit diagram showing another configuration example of the light control circuit.
Figure 7B:
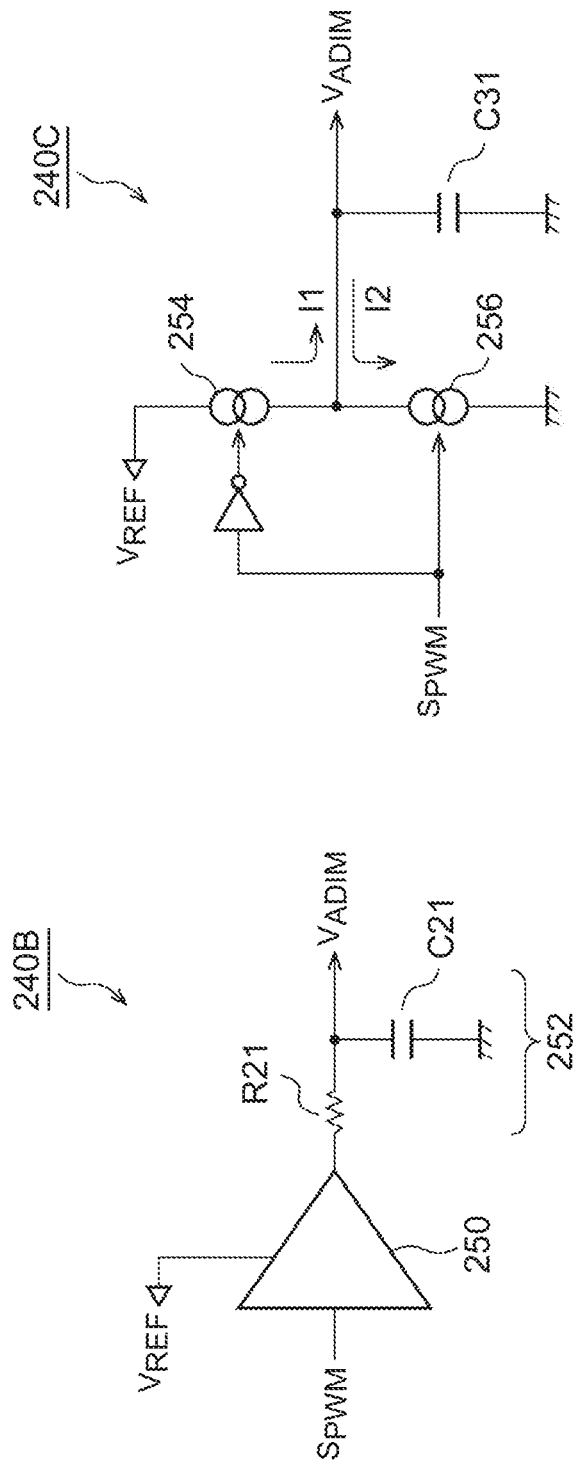
FIG. 7B is a circuit diagram showing another configuration example of the light control circuit.

FIGS. 7A and 7B are circuit diagrams showing other configuration examples (240B, 240C) of the light control circuit 240. The light control circuit 240B of FIG. 7A includes a buffer (or inverter) 250 and a low pass filter 252. The buffer (or inverter) 250 may be regarded as a driver. The low pass filter 252 includes a capacitor C21 and a resistance R21. The light control signal $V_{ADIM}$ gains the waveform of an output $S_{PWM}'$ of the buffer 250 that is softened.

The light control circuit 240C of FIG. 7B includes current sources 254, 256, and a capacitor C31. The current sources 254, 256 can be switched to ON and OFF to perform complementary switching in accordance with the pulse signal $S_{PWM}$. Thus, the capacitor C31 is alternately charged and discharged. The capacitor C31 has a voltage VC31 that changes with a slope that corresponds to currents I1, I2 generated by the current sources 254, 256. Accordingly, the light control signal $V_{ADIM}$ can gradually be changed.

Second Embodiment

Figure 8:
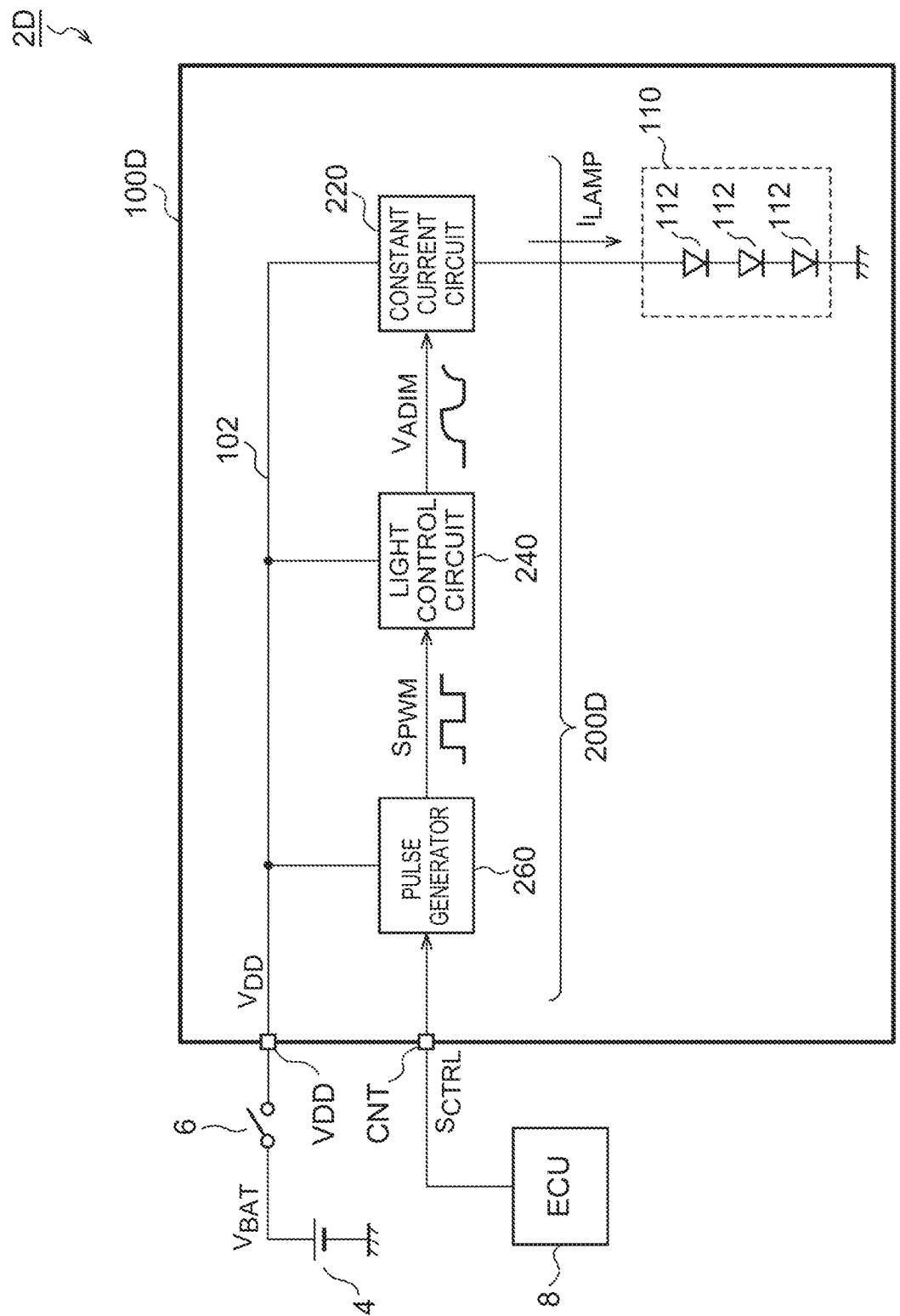
FIG. 8 is a block diagram of a lamp system according to a second embodiment of the present disclosure.

In the first embodiment, the pulse signal $S_{PWM}$ is generated by the ECU 8. However, without being limited thereto, the pulse signal $S_{PWM}$ may be generated inside a lamp 100D. FIG. 8 is a block diagram of a lamp system 2D according to a second embodiment of the present disclosure. The lamp 100D has a control terminal CNT. The ECU 8 supplies to the control terminal CNT a control signal $S_{CTRL}$ that specifies a luminance or lighting mode of the light source 110. The control signal $S_{CTRL}$ may be an analog signal or may be a digital signal.

A lighting circuit 200D includes a pulse generator 260 in addition to the constant current circuit 220 and the light control circuit 240. The pulse generator 260 generates a pulse signal $S_{PWM}$ having a duty ratio corresponding to the control signal $S_{CTRL}$. The light control circuit 240 softens the pulse signal $S_{PWM}$ generated by the pulse generator 260 to generate a light control signal $V_{ADIM}$.

The second embodiment makes it possible to reduce electromagnetic noise of the lamp system 2D or makes it easy to cope with the electromagnetic noise as in the first embodiment.

Description is now given of the applications of the lamp 100. The lamp 100 is embodied as a stop lamp, a tail lamp, and a turn signal lamp, for example. The light source 110 may be a red LED or an amber LED. One suitable aspect of the lamp 100 is an LED socket accommodating the light source 110 and the lighting circuit 200 in one package. The LED socket has a shape detachable from a lamp body.

Figure 9A:
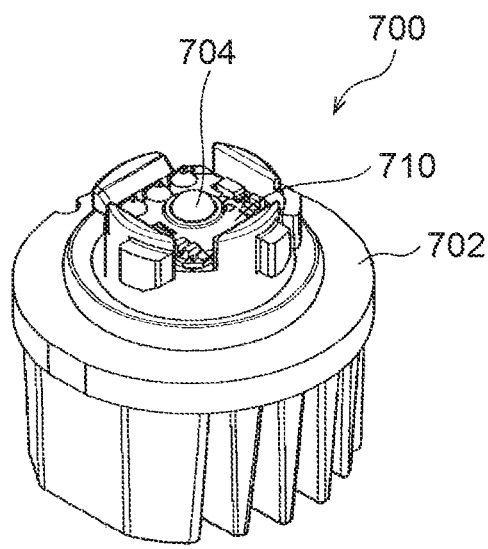
FIG. 9A is a perspective view of an external appearance of a LED socket.
Figure 9B:
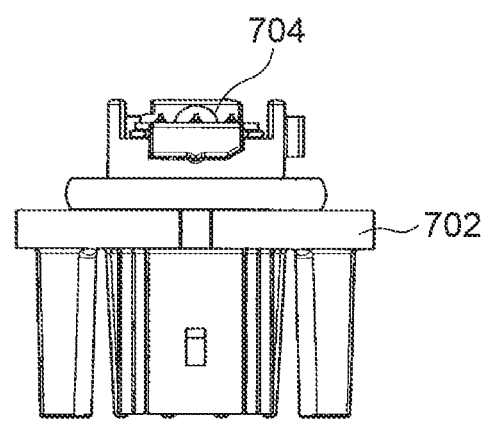
FIG. 9B is a front view of the LED socket.
Figure 9C:
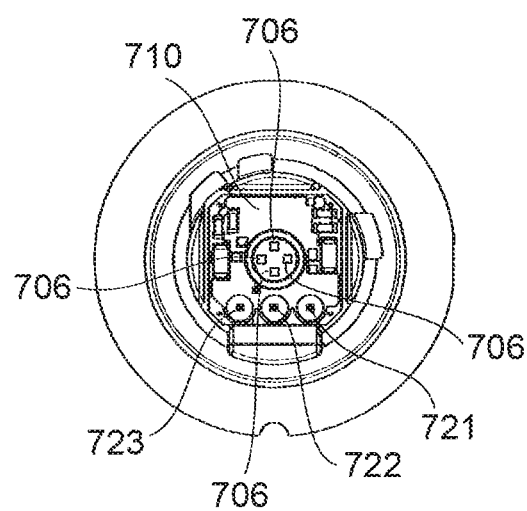
FIG. 9C is a plan view of the LED socket.
Figure 9D:
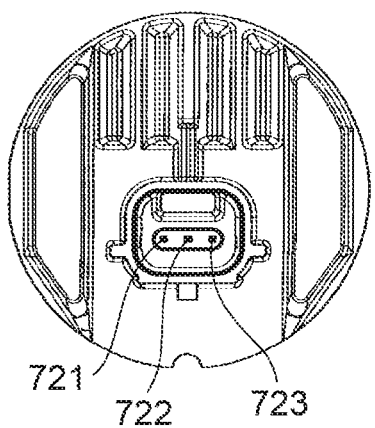
FIG. 9D is a bottom view of the LED socket.

FIGS. 9A to 9D show an LED socket 700 that is an example of the lamp 100. FIG. 9A is a perspective view of an external appearance of the LED socket 700. FIG. 9B shows a front view of the LED socket 700. FIG. 9C shows a plan view of the LED socket 700. FIG. 9D shows a bottom view of the LED socket 700.

A casing 702 has a shape detachable from an unshown lamp body. In a central portion of the casing 702, a plurality of light-emitting elements 706 is mounted. The light-emitting elements 706 are covered with a transparent cover 704. Components of the lighting circuit 200 are mounted on a substrate 710.

Figure 2:
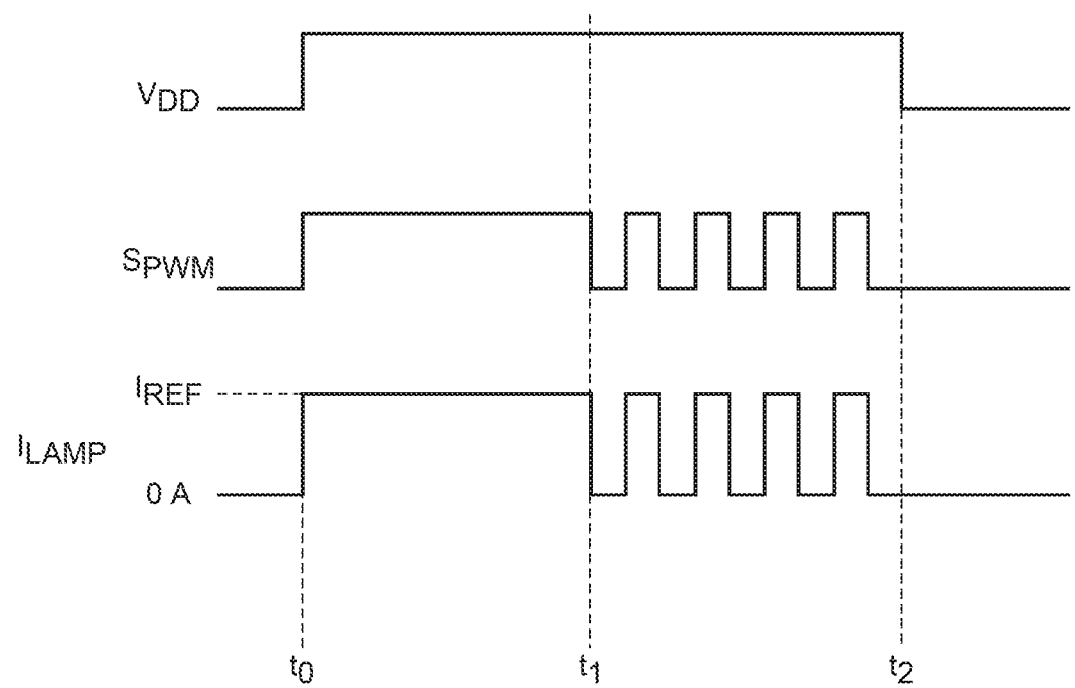
FIG. 2 is an operation waveform chart of the lamp in FIG. 1.

The light-emitting elements 706 correspond to the light-emitting elements 112 in FIG. 2 or other drawings. Four light-emitting elements 706 are connected in series to form the light source 110. One example of the LED socket 700 is a lamp that functions as both a stop lamp and a tail lamp. In this case, a red LED chip is selected as the light-emitting elements 706. When the lamp is turned on as a stop lamp, the light-emitting elements 706 are turned on with a relatively large duty ratio (for example, 100%). When the lamp is turned on as a tail lamp, the light-emitting elements 706 are turned on with a relatively small duty ratio (for example, 5 to 10%).

On the bottom face side of the casing 702, three pins 721, 722, 723 are exposed. The pin 721 receives supply of a first input voltage $V_{IN1}$ through a switch, and the pin 722 receives supply of a ground voltage. The pin 723 receives supply of a second input voltage $V_{IN2}$ that becomes high when the tail lamp is turned on. The pins 721 to 723 penetrate the inside of the casing 702, with one-end sides of the pins 721 to 723 being connected to a wiring pattern of the substrate 710.

The second input voltage $V_{IN1}$ can be associated with the control signal $S_{CTRL}$ in the second embodiment. Therefore, when the second input voltage $V_{IN2}$ is high, the lighting circuit 200 generates a pulse signal $S_{PWM}$ having a relatively small duty ratio such that the waveform of the pulse signal $S_{PWM}$ is softened to generate the lamp current $I_{LAMP}$.

Third Embodiment

Figure 10:
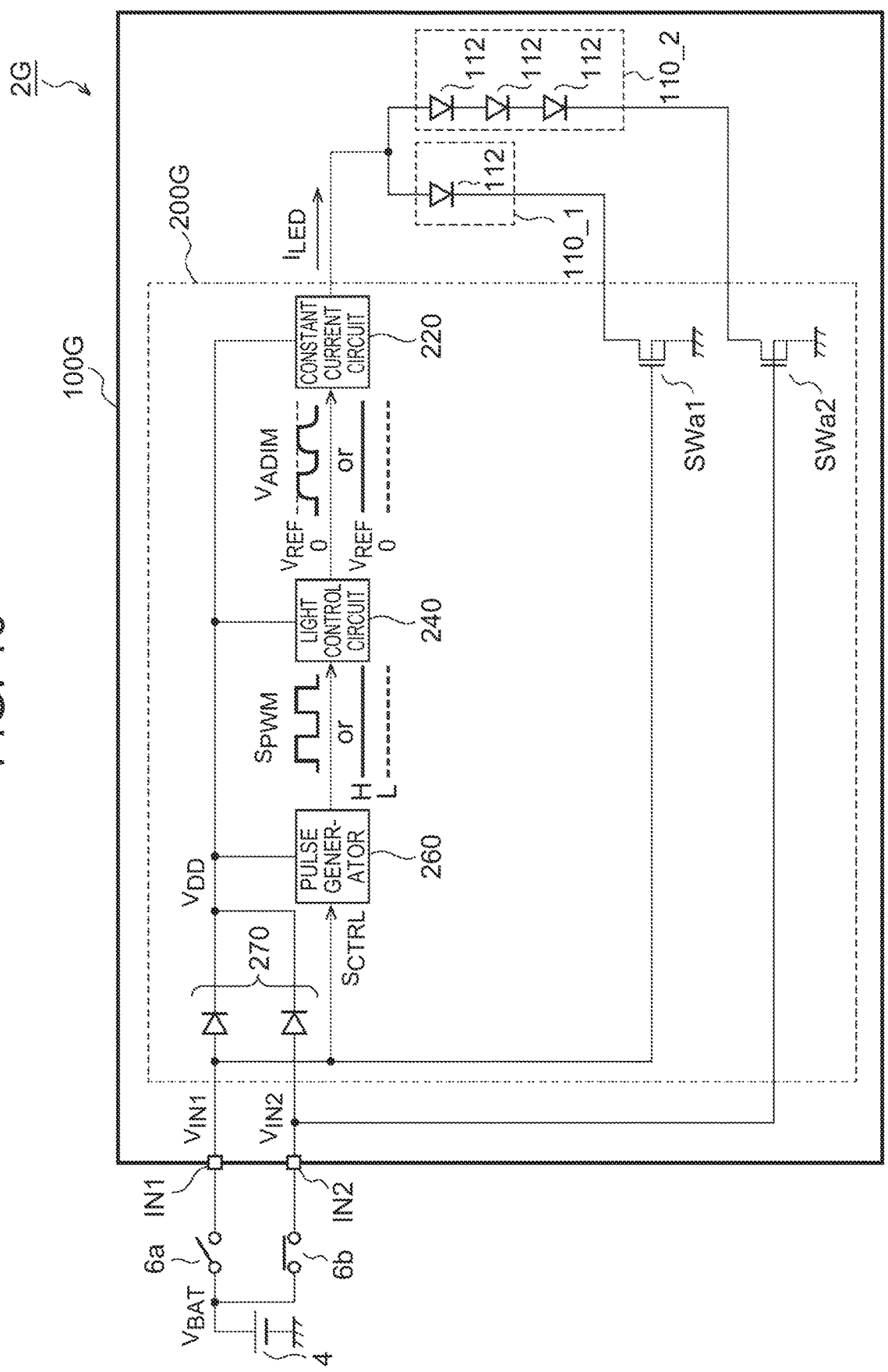
FIG. 10 is a block diagram of a lamp system including a lamp according to a third embodiment.

FIG. 10 is a block diagram of a lamp system 2G including a lamp 100G according to a third embodiment. The lamp 100G includes two light sources 110_1, 110_2 that are different in function, and a lighting circuit 200G that controls turning on-off and luminance of the two light sources 110_1, 110_2.

The lamp 100G has a first input terminal IN1 that receives supply of a first input voltage $V_{IN1}$ that becomes active (high level) during a period when the first light source 110_1 is to be turned on. The lamp 100G also has a second input terminal IN2 that receives supply of a second input voltage $V_{IN2}$ that becomes active (high level) during a period when the light source 110_2 is to be turned on. In the present embodiment, the first input voltage $V_{IN1}$ and the second input voltage $V_{IN1}$ do not become active at the same time. For example, the lamp system 2G includes switches 6a, 6b. When the switch 6a is set to ON, the first input voltage $V_{IN1}$ becomes active. When the switch 6b is set to ON, the second input voltage $V_{IN2}$ becomes active.

A target luminance of the first light source 110_1 is lower than a target luminance of the second light source 110_2. Therefore, the number of the light-emitting elements 112 (one in this example) included in the first light source 110_1 is less than the number of the light-emitting elements 112 (three in this example) included in the second light source 110_2. In order to turn on the first light source 110_1 with less luminance, the constant current circuit 220 performs PWM light control (dimming) with a first duty ratio while the first light source 110_1 is turned on, and performs PWM light control (dimming) with a second duty ratio that is larger than the first duty ratio while the second light source 110_2 is turned on. In the following description, the second duty ratio is set to 100%.

The lighting circuit 200G includes a first serial switch SWa1 and a second serial switch SWa2, in addition to the constant current circuit 220, the light control circuit 240, and the pulse generator 260 described before. The constant current circuit 220 can be configured from a linear regulator as described before. However, without being limited thereto, the constant current circuit 220 may be configured from a DC-DC converter.

The first serial switch SWa1 is provided in series with the first light source 110_1 on a first route. The second serial switch SWa2 is provided in series with the second light source 110_2 on a second route that is parallel to the first route. The first serial switch SWa1 is set to ON during a turning-on period of the first light source 110_1, and the second serial switch SWa2 is set to ON during a turning-on period of the second light source 110_2. Therefore, electrical connection and disconnection (ON-OFF) of each of the first serial switch SWa1 and the second serial switch SWa2 may be controlled based on the first input voltage $V_{IN1}$ and the second input voltage $V_{IN1}$.

The pulse generator 260 generates a pulse signal $S_{PWM}$ having a first duty ratio when the first input voltage $V_{IN1}$ is active and having a second duty ratio when the first input voltage $V_{IN1}$ is inactive. The pulse generator 260 receives the first input voltage $V_{IN1}$ as the control signal $S_{CTRL}$ of FIG. 8, and selects a duty ratio of the pulse signal $S_{PWM}$ based on the first input voltage $V_{IN1}$.

The configuration and operation of the light control circuit 240 and the constant current circuit 220 are as described above. The lighting circuit 200G is configured such that the first input voltage $V_{IN1}$ and the second input voltage $V_{IN2}$ are used as the electric power source voltage $V_{DD}$. For example, the lighting circuit 200G may include a diode OR circuit 270 to select as the electric power source voltage $V_{DD}$ a higher voltage, out of the first input voltage $V_{IN1}$ and the second input voltage V.

When the pulse signal $S_{PWM}$ has a first duty ratio that is lower than 100% while the first light source 110_1 is turned on, the light control signal $V_{ADIM}$ has a pulse form, and at least one of the positive edge and the negative edge is softened in each pulse. When the pulse signal $S_{PWM}$ has a duty ratio of 100% while the second light source 110_2 is turned on, the light control signal $V_{ADIM}$ becomes a direct current signal. Therefore, a driving current $I_{LED}$ also becomes a direct current signal.

Figure 11:
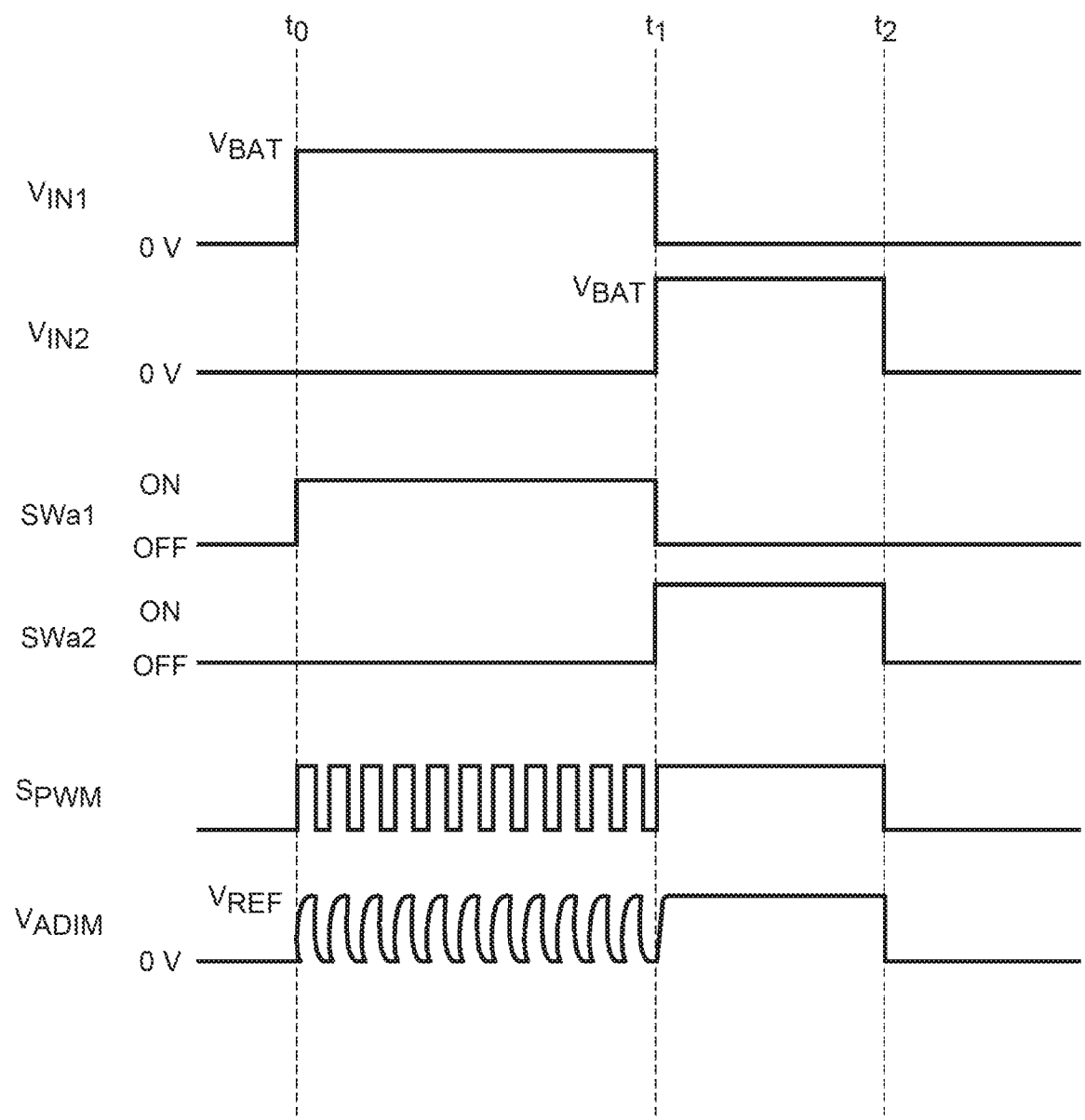
FIG. 11 is an operation waveform chart of the lamp system in FIG. 10.

The configuration of the lamp 100G is as described above. Description is now given of the operation of the lamp 100G. FIG. 11 is an operation waveform chart of the lamp system 2G in FIG. 10. Before time t0, both $V_{IN1}$ and $V_{IN2}$ are inactive, and both the first light source 110_1 and the second light source 110_2 are turned off.

At time t0, the first input voltage $V_{IN1}$ becomes active (battery voltage $V_{BAT}$) in response to an instruction for turning on the first light source 110_1. The first serial switch SWa1 is set to ON by the first input voltage $V_{IN1}$. The pulse generator 260 generates a pulse signal $S_{PWM}$ having the first duty ratio. The light control circuit 240 softens the positive edge and the negative edge of the pulse signal $S_{PWM}$ to generate a light control signal $V_{ADIM}$. The constant current circuit 220 generates a driving current $I_{LED}$ that is proportional to the light control signal $V_{ADIM}$. Thus, the light source 110_1 is turned on in the state of being dimmed by PWM.

At time t1, the second input voltage $V_{IN2}$ becomes active (battery voltage $V_{BAT}$) and the first input voltage $V_{IN1}$ becomes inactive (0 V) in response to an instruction for turning on the second light source 110_2. The second serial switch SWa2 is set to ON by the second input voltage $V_{IN2}$. The pulse generator 260 generates a pulse signal (non-pulse in actuality) $S_{PWM}$ having the second duty ratio (100%). At the time, the light control circuit 240 generates a light control signal $V_{ADIM}$ of a direct current. The constant current circuit 220 generates a driving current $I_{LED}$ that is proportional to the light control signal $V_{ADIM}$. Thus, the light source 110_2 is turned on. When the second input voltage $V_{IN2}$ becomes inactive at time t2, the second light source 110_2 is turned off.

The operation of the lamp 100G is as described above. The lamp 100G enables the two light sources 110_1, 110_2 to exclusively emit light with a different luminance. Although the first light source 110_1 is dimmed by PWM when the first light source 110_1 is turned on, softening the waveform of the driving current $I_{LED}$ can restrain generation of electromagnetic noise and can simply cope with the electromagnetic noise.

Fourth Embodiment

Figure 12:
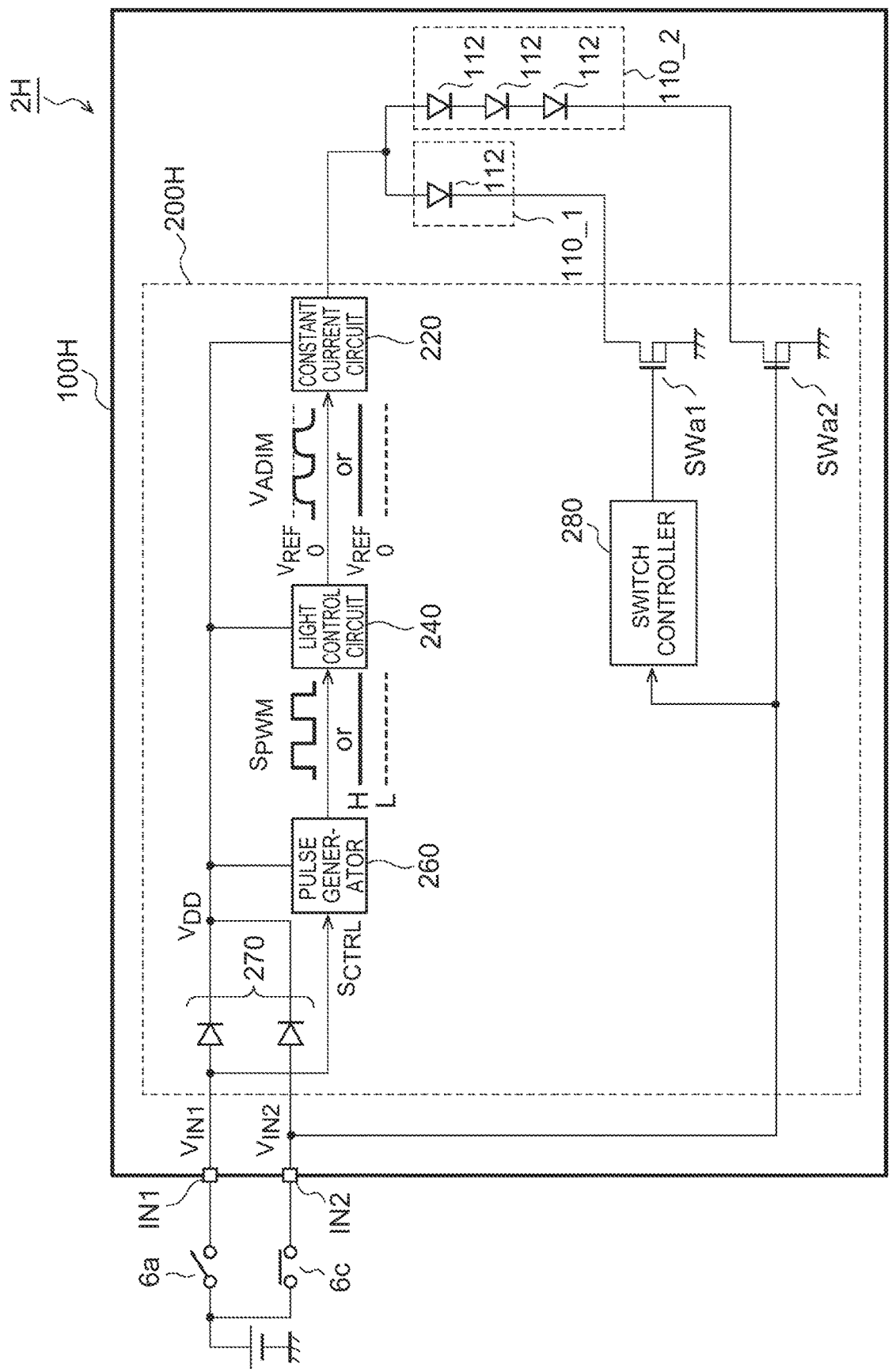
FIG. 12 is a block diagram of a lamp system including a lamp according to a fourth embodiment.

FIG. 12 is a block diagram of a lamp system 2H including a lamp 100H according to a fourth embodiment. The lamp 100H includes two light sources 110_1, 110_2 that are different in function, and a lighting circuit 200H that controls turning on-off and luminance of the two light sources 110_1, 110_2 as in the third embodiment.

In the fourth embodiment, the first light source 110_1 is a lamp constantly turned on, while the second light source 110_2 is a lamp that repeatedly flickers in a cycle perceptible by human being. In the following description, the first light source 110_1 is a clear lamp including white light-emitting elements, and the light source 110_2 is a turn signal lamp including amber light-emitting elements.

The first input voltage $V_{IN1}$ becomes active (high level) while the first light source 110_1 is turned on. The second input voltage $V_{IN2}$ becomes active while the second light source 110_2 is turned on. However, the second input voltage $V_{IN2}$ alternately repeats high and low in a prescribed cycle (0.7 second, 50% of duty ratio) in order to flicker the second light source 110_2. The second input voltage $V_{IN2}$ may be generated by a relay 6c.

In the third embodiment, the first input voltage $V_{IN1}$ and the second input voltage $V_{IN2}$ exclusively become active. However, in the fourth embodiment, both the first input voltage $V_{IN1}$ and the second input voltage $V_{IN2}$ can concurrently become active. In the state where both the two voltages, the input voltage $V_{IN1}$ and the $V_{IN2}$, are active, the lighting circuit 200H preferentially turns on the second light source 110_2, and turns off the first light source 110_1.

The second input voltage $V_{IN2}$ is supplied to the second serial switch SWa2. Therefore, the second serial switch SWa2 is set to ON and OFF in accordance with the second input voltage $V_{IN2}$ while the second input voltage $V_{IN2}$ is active. As a result, the second light source 110_2 flickers.

Meanwhile, the first serial switch SWa1 is controlled in accordance with the first input voltage $V_{IN1}$. However, when the second input voltage $V_{IN2}$ is active, the first serial switch SWa1 needs to be fixed to OFF. Therefore, the lamp 100G includes a switch controller 280. The switch controller 280 sets the first serial switch SWa1 to an ON state when the second input voltage $V_{IN2}$ is inactive, and sets the first serial switch SWa1 to an OFF state when the second input voltage $V_{IN2}$ is active.

Figure 13:
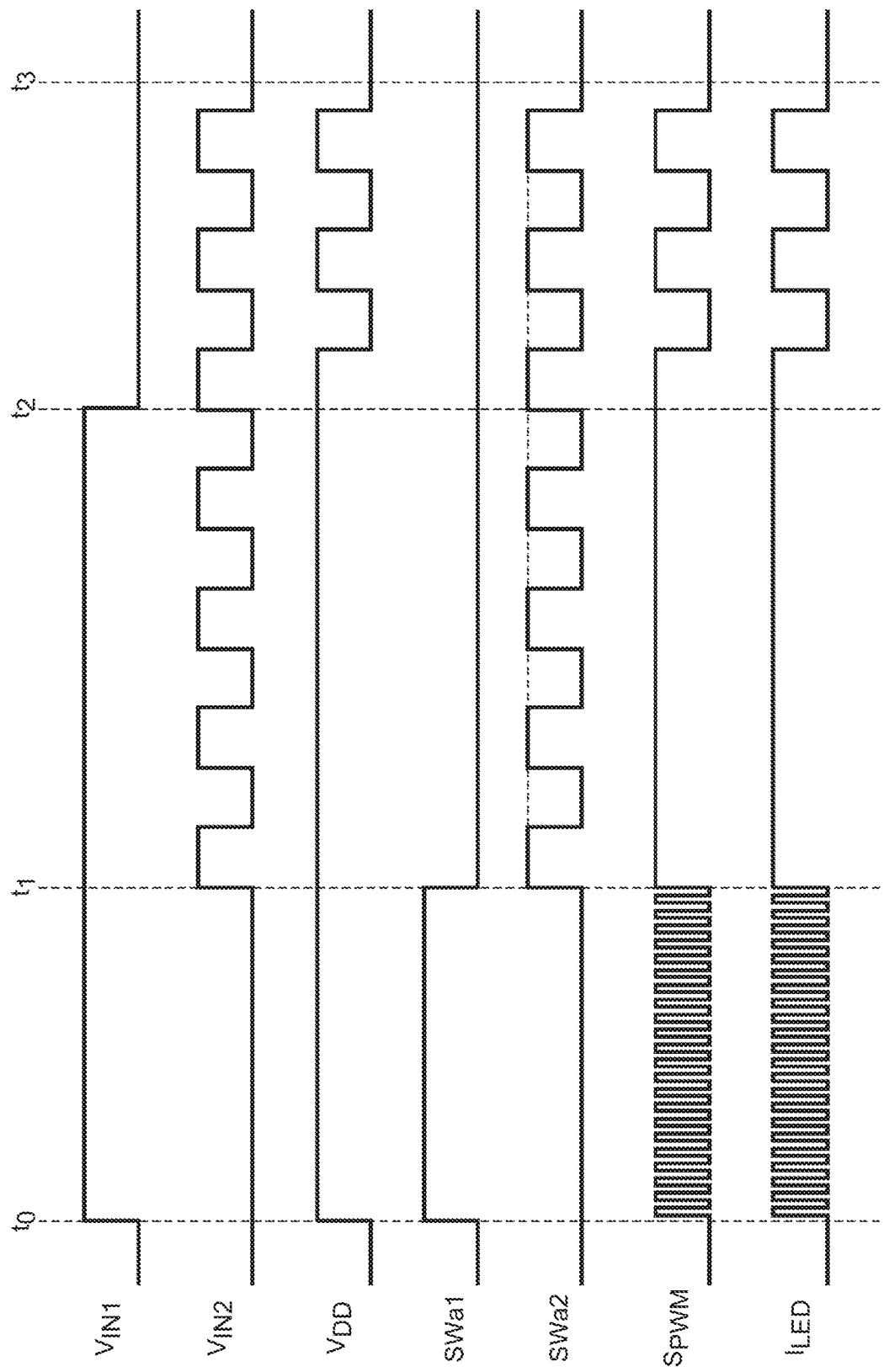
FIG. 13 is an operation waveform chart of the lamp system in FIG. 12.

The configuration of the lamp system 2H is as described above. Description is now given of the operation of the lamp system 2H. FIG. 13 is an operation waveform chart of the lamp system 2H in FIG. 12. Before time t0, both $V_{IN1}$ and $V_{IN2}$ are inactive, and both the first light source 110_1 and the second light source 110_2 are turned off.

During the period from t0 to t1, only the first input voltage $V_{IN1}$ is active, and the first serial switch SWa1 is set to ON. The pulse generator 260 generates a pulse signal $S_{PWM}$ having the first duty ratio. The constant current circuit 220 generates a pulsed driving current $I_{LED}$ having the first duty ratio, and supplies the generated driving current $I_{LED}$ to the first light source 110_1.

During the period from t1 to t2, both the first input voltage $V_{IN1}$ and the second input voltage $V_{IN2}$ become active. At the time, the first serial switch SWa1 is set to OFF, and the second serial switch SWa2 is set to ON. The pulse generator 260 generates a pulse signal $S_{PWM}$ having the second duty ratio (100%). The constant current circuit 220 generates a driving current $I_{LED}$ of a direct current, and supplies the generated driving current $I_{LED}$ to the second light source 110_2.

During the period from t2 to t3, only the second input voltage $V_{IN2}$ becomes active. At the time, the first serial switch SWa1 is set to OFF, and the second serial switch SWa2 is set to ON. The pulse generator 260 generates a pulse signal $S_{PWM}$ having the second duty ratio (100%). However, the electric power source voltage $V_{DD}$ is repeatedly supplied and cut off in time division in accordance with the second input voltage $V_{IN2}$. While the electric power source voltage $V_{DD}$ is cut off, the constant current circuit 220, the light control circuit 240, and the pulse generator 260 are inoperable. Therefore, the pulse signal $S_{PWM}$ is low, and the driving current $I_{LED}$ is 0 A. In short, during the period from t2 to t3, it can also be recognized that flickering of the second light source 110_2 is controlled by repetition of supply and cut-off of the electric power source voltage $V_{DD}$.

The operation of the lamp system 2H is as described above. The lamp system 2H makes it possible to restrain the electromagnetic noise when the first light source 110_1 is dimmed by PWM. Moreover, the second light source 110_2 can be flickered in accordance with the second input voltage $V_{IN2}$, and while the second light source 110_2 flickers, the first light source 110_1 can be turned off.

Fifth Embodiment

Figure 14:
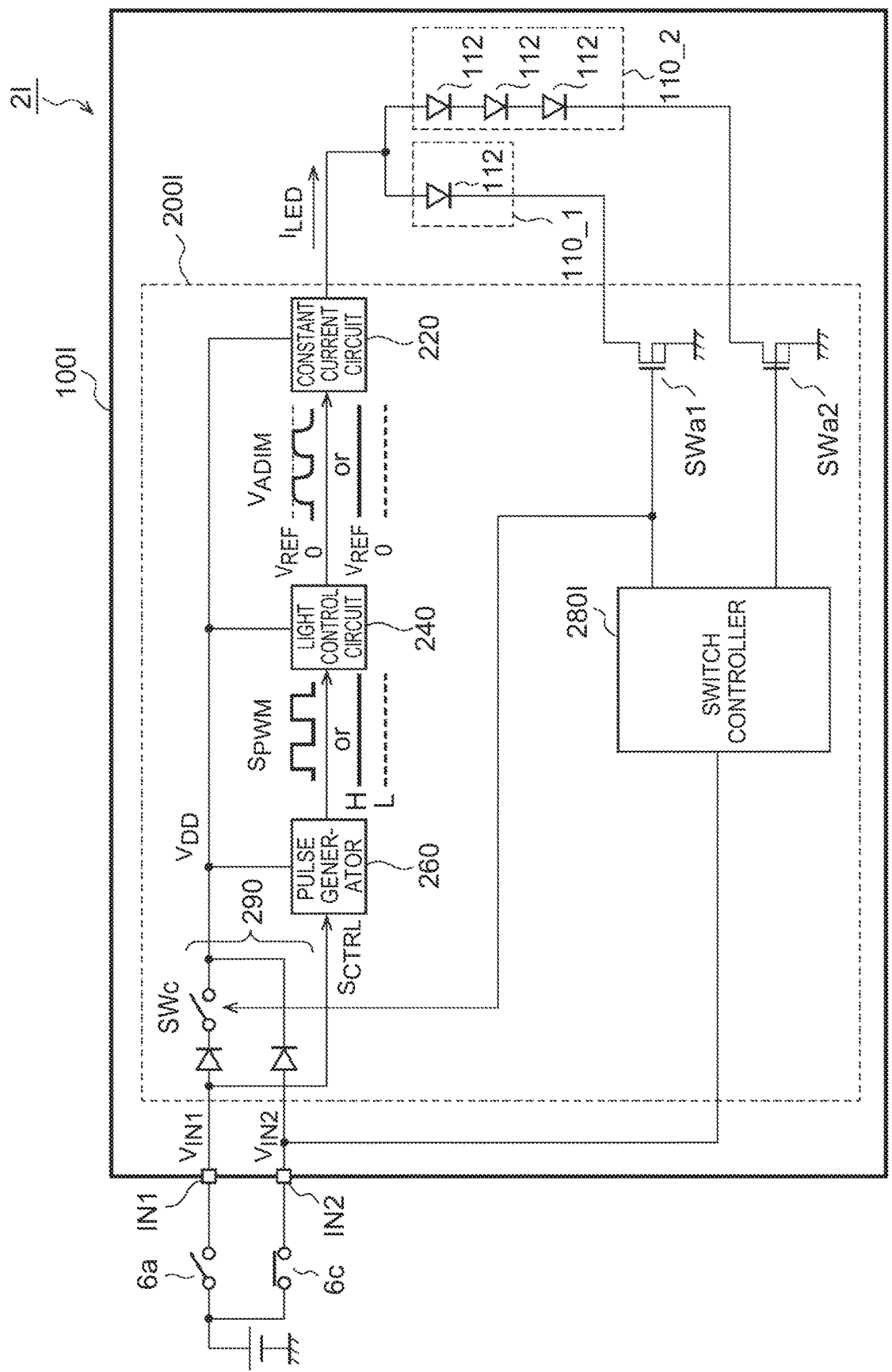
FIG. 14 is a block diagram of a lamp system including a lamp according to a fifth embodiment.

FIG. 14 is a block diagram of a lamp system 2I including a lamp 100I according to a fifth embodiment. The function of the lamp 100I in the fifth embodiment is similar to the fourth embodiment.

The lighting circuit 200I includes an electric power source selection circuit 290 in place of the diode OR circuit 270 in the fourth embodiment. The electric power source selection circuit 290 outputs $V_{DD}=V_{IN1}$ when only the first input voltage $V_{IN1}$ is active. The electric power source selection circuit 290 outputs an intermittent electric power source voltage $V_{DD}=V_{IN2}$ when the second input voltage $V_{IN2}$ is active. For example, the electric power source selection circuit 290 includes two diodes and an additional switch SWc. The switch SWc is set to OFF when the second input voltage $V_{IN2}$ is active, and set to ON when the second input voltage $V_{IN2}$ is inactive. The switch SWc may be set to ON and OFF in conjunction with the first serial switch SWa1.

The lighting circuit 200I includes a switch controller 280I in place of the switch controller 280 in the fourth embodiment. The switch controller 280I controls both the first serial switch SWa1 and the second serial switch SWa2. The first serial switch SWa1 is controlled in a similar manner as in the fourth embodiment. The switch controller 280I sets the first serial switch SWa1 to the ON state when the second input voltage $V_{IN2}$ is inactive, and sets the first serial switch SWa1 to the OFF state when the second input voltage $V_{IN2}$ is active.

The switch controller 280I sets the second serial switch SWa2 fixedly to the ON state when the second input voltage $V_{IN2}$ is active, and sets the second serial switch SWa2 to the OFF state when the second input voltage $V_{IN2}$ is inactive.

Figure 15:
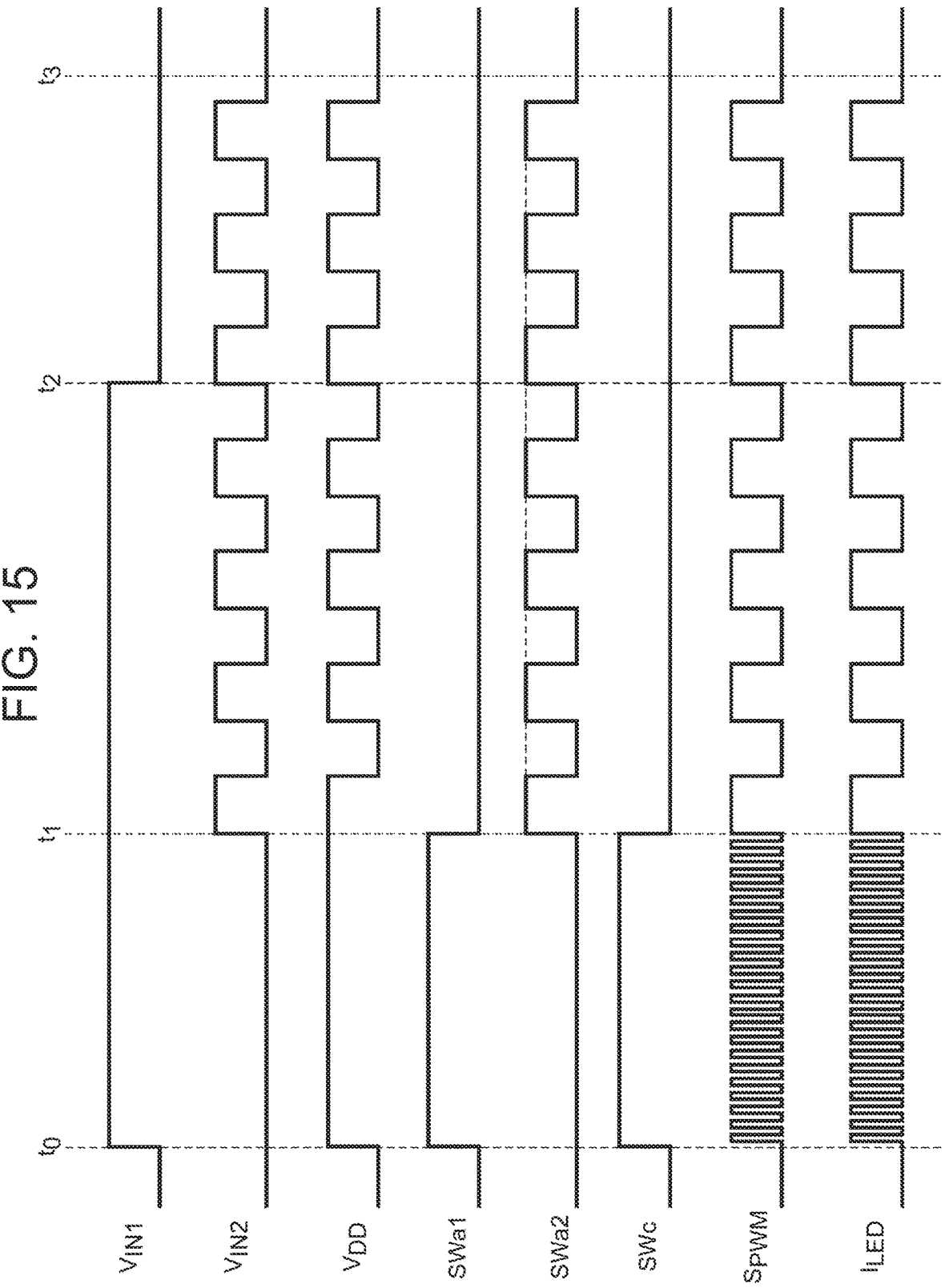
FIG. 15 is an operation waveform chart of the lamp system in FIG. 14.

The configuration of the lamp system 2I is as described above. Description is now given of the operation of the lamp system 2I. FIG. 15 is an operation waveform chart of the lamp system 2I in FIG. 14. Before time t0, both $V_{IN1}$ and $V_{IN2}$ are inactive, and both the first light source 110_1 and the second light source 110_2 are turned off.

Operation during the period from t0 to t1 and during the period from t2 to t3 is similar to the operation in the fourth embodiment, though the operation during the period from t1 to t2 is different from the operation in the fourth embodiment. The operation in the fifth embodiment is different from that in the fourth embodiment in the point that, during the period from t1 to t2, an intermittent second input voltage $V_{IN2}$ is supplied to the lighting circuit 200I as the electric power source voltage $V_{DD}$ though both the first input voltage $V_{IN1}$ and the second input voltage $V_{IN2}$ are active. In FIG. 15, the operation during the period from t1 to t2 is similar to the operation during the period from t2 to t3 except for the operation of $V_{IN1}$.

The operation of the lamp system 2I is as described above. The lamp system 2I can restrain electromagnetic noise generated when the first light source 110_1 is dimmed by PWM. Moreover, the second light source 110_2 can be flickered in accordance with the second input voltage $V_{IN2}$, and while the second light source 110_2 flicker, the first light source 110_1 can be turned off.

The present disclosure has been described based on the embodiments. Since the embodiments are merely illustrative, it is understood by those skilled in the art that combinations of the respective component members and respective processing processes can be modified in various modes and such modifications are within the range of the present disclosure. Hereinafter, such modifications will be described.

First Modification

Figure 16:
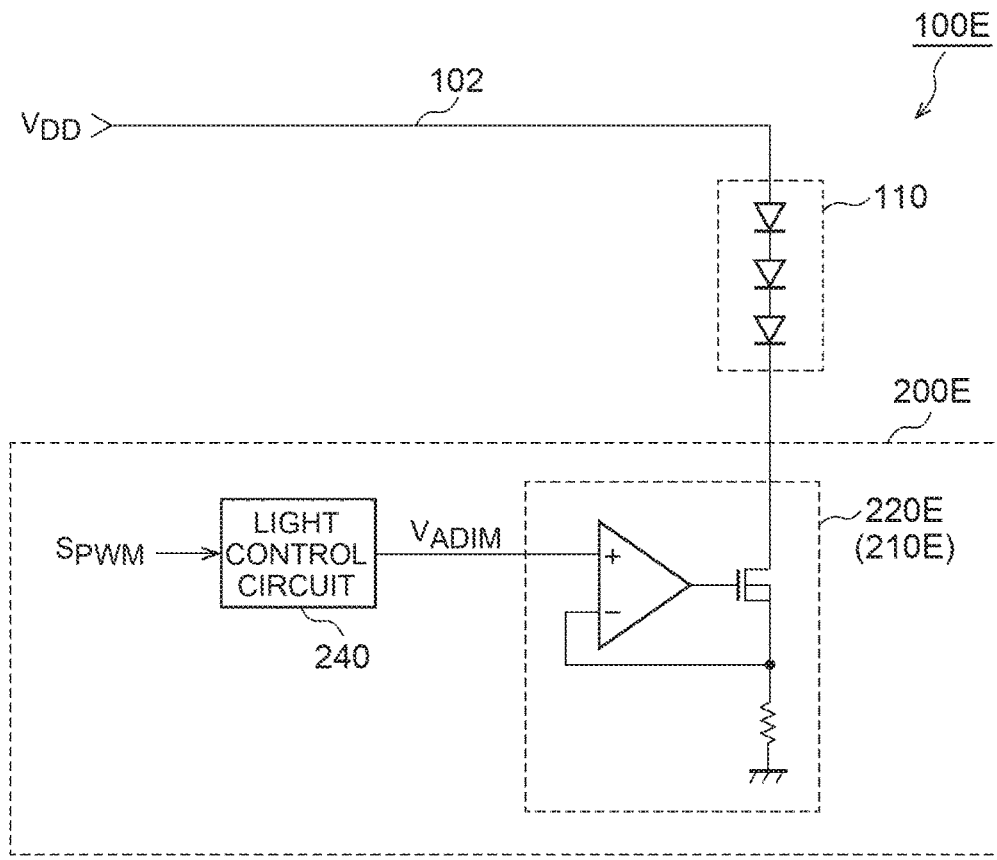
FIG. 16 is a circuit diagram of a lamp according to a first modification.

In the embodiments, the constant current circuit 220 is configured as a source type. However, the constant current circuit 220 may be configured as a sink type. FIG. 16 is a circuit diagram of a lamp 100E according to a first modification. The lighting circuit 200E includes a sink-type constant current circuit 220E. An anode of a light source 110 is connected with the electric power source line 102, and the output terminal of the constant current circuit 220E is connected with a cathode of the light source 110. The constant current circuit 220E includes a sink-type linear regulator 210E. The V-I converter 230 and the resistance R3 of FIG. 3 are omitted. With the modification, the same effect as the lamp 100 of FIG. 3 can be obtained.

Second Modification

Figure 17:
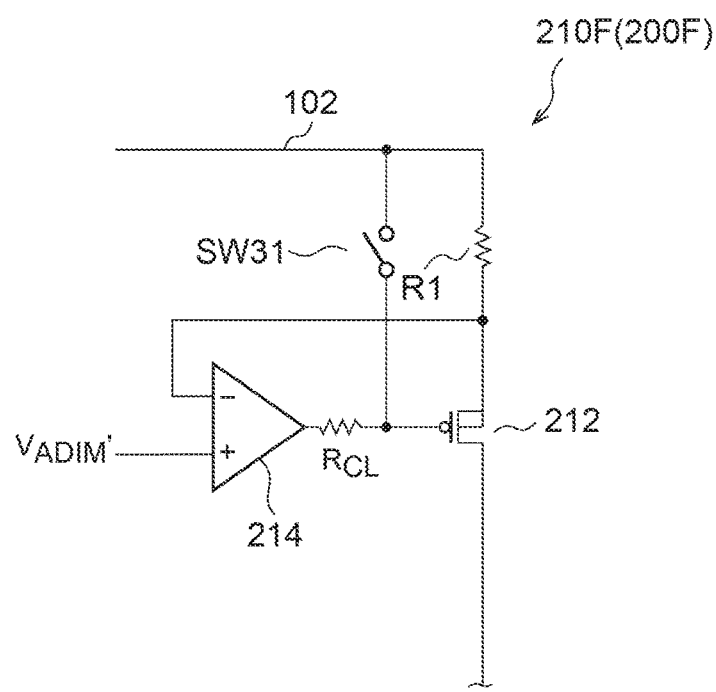
FIG. 17 is a fragmentary circuit diagram of a lighting circuit according to a second modification.

FIG. 17 is a fragmentary circuit diagram of a lighting circuit 200F according to a second modification. A linear regulator 210F includes a switch SW31 provided between the gate and the source of the output transistor 212 (or between the gate and the electric power source line 102). The switch SW31 can be regarded as a third switch.

In ideal conditions, when $V_{ADIM}'=V_{DD}$, the target amount $I_{REF}$ of the lamp current $I_{LAMP}$ is 0 A by expression (2). However, when the error amplifier 214 has an offset voltage, the target amount $I_{REF}$ does not become zero, and the light source 110 may turn on with low-luminance, even when $V_{ADIM}'=V_{DD}$. Accordingly, in the period when the light source 110 is to be turned off, the switch SW31 is set to ON. As a result, the output transistor 212 can reliably be set to OFF, and the lamp current $I_{LAMP}$ can be adjusted to zero. To the output of the operational amplifier 214, a current limit resistance $R_{CL}$ may be inserted. The current limit resistance $R_{CL}$ can limit the current flowing into the switch SW31.

Third Modification

The LED socket 700 may be a lamp that functions as both a daytime running lamp (DRL) and a clearance lamp. In this case, the light-emitting elements 706 may be configured as a white LED chip, and an appropriate duty ratio is selected in accordance with a lighting mode.

Fourth Modification

In the second embodiment of FIG. 8, the control signal $S_{CTRL}$ is temporarily converted into a PWM signal, and the PWM signal is softened to generate a light control signal $V_{ADIM}$. However, generation of the light control signal $V_{ADIM}$ is not limited to this. The light control circuit 240 may generate the light control signal $V_{ADIM}$ directly from the control signal $S_{CTRL}$.

Although the present disclosure has been described using specific words and phrases based on the embodiments, the embodiments are merely illustrative of the principle and applications of the present disclosure. The present embodiments may embrace many modifications and changes of arrangement without departing from the concept of the present disclosure defined by the claims.

What is claimed is:

1. A lighting circuit of a semiconductor light source, the lighting circuit comprising:
   a light control circuit configured to generate a pulsed light control signal having a duty ratio corresponding to an input pulse signal and having at least one edge softened in each pulse; and
   a constant current circuit including a linear regulator, the constant current circuit being configured to stabilize a lamp current flowing into the semiconductor light source to a target amount corresponding to the light control signal.

2. The lighting circuit according to claim 1, wherein:
   the light control circuit includes
      a capacitor, and
      a charging and discharging circuit configured to charge and discharge the capacitor in accordance with the pulse signal; and
   the light control signal is configured to be in accordance with a voltage of the capacitor.

3. The lighting circuit according to claim 2, wherein:
   the charging and discharging circuit includes
      a first switch,
      a first resistance, and
      a second switch, the first switch and the first resistance being provided in series between one end of the capacitor and a reference voltage line, the second switch being provided between the one end of the capacitor and a ground line; and
   the first switch and the second switch are configured to perform complementary switching in accordance with the pulse signal.

4. The lighting circuit according to claim 3, wherein the charging and discharging circuit further includes a second resistance provided in series with the second switch between the one end of the capacitor and the ground line.

5. The lighting circuit according to claim 2, wherein:
   the charging and discharging circuit includes
      a first switch,
      a second switch, and
      a second resistance, the first switch being provided between one end of the capacitor and a reference voltage line, the second switch and the second resistance being provided in series between the one end of the capacitor and a ground line; and
   the first switch and the second switch are configured to perform complementary switching in accordance with the pulse signal.

6. The lighting circuit according to claim 2, wherein:
   the charging and discharging circuit includes
      a first current source provided between one end of the capacitor and a reference voltage line, and
      a second current source provided between the one end of the capacitor and a ground line; and
   the first current source and the second current source are configured to complementarily be set to ON in accordance with the pulse signal.

7. The lighting circuit according to claim 2, wherein the charging and discharging circuit includes
   a driver configured to output a high voltage and a low voltage in accordance with the pulse signal, and
   a resistance provided between an output of the driver and one end of the capacitor.

8. The lighting circuit according to claim 1, further comprising a switch provided between one of an electric power source line and a ground line, and a gate of an output transistor of the linear regulator.

9. The lighting circuit according to claim 1, further comprising a pulse generator configured to receive a control signal that specifies luminance of the semiconductor light source and generate the pulse signal having a duty ratio corresponding to the control signal.

10. The lighting circuit according to claim 1, wherein:
    the semiconductor light source includes a first light source and a second light source each having one of an anode side and a cathode side being connected in common; and
    the lighting circuit further includes
       a first serial switch that is in series with the first light source, and
       a second serial switch that is in series with the second light source.

11. A vehicle lamp, comprising:
    the semiconductor light source; and
    the lighting circuit according to claim 1.

12. A vehicle lamp, comprising:
    a semiconductor light source;
    a light control circuit, the light control circuit being configured to receive a control signal that specifies luminance of the semiconductor light source and generate a pulsed light control signal, the light control signal having a duty ratio corresponding to the control signal and having at least one edge softened in each pulse; and
    a constant current circuit including a linear regulator, the constant current circuit being configured to stabilize a lamp current flowing into the semiconductor light source to a target amount corresponding to the light control signal.

13. A vehicle lamp, comprising:
    a first light source and a first serial switch provided in series on a first route;
    a second light source and a second serial switch provided in series on a second route in parallel with the first route;
    a first input terminal configured to receive a first input voltage that becomes active when the first light source is to be turned on;
    a second input terminal configured to receive a second input voltage that becomes active when the second light source is to be turned on;
    a pulse generator configured to generate a pulse signal having a first duty ratio when the first input voltage is active and having a second duty ratio when the first input voltage is inactive;
    a light control circuit configured to generate a pulsed light control signal having a duty ratio corresponding to the pulse signal and having at least one edge softened in each pulse; and
    a constant current circuit configured to stabilize a lamp current flowing into the light sources including the first route and the second route to a target amount corresponding to the light control signal.

14. The vehicle lamp according to claim 13, wherein:
    the second input voltage is a signal that alternately repeats high and low when the second input voltage is active;

the second serial switch is controlled to be set to ON and OFF in accordance with the second input voltage; and the first serial switch is configured to be set to ON when the first input voltage is active and the second input voltage is inactive.

15. The vehicle lamp according to claim 13, further comprising a switch controller configured such that the first serial switch is fixedly set to OFF when the second input voltage is active, wherein the second input voltage is a signal that alternately repeats high and low when the second input voltage is active.

\* \* \* \* \*